United States Patent
Fuchikami et al.

(10) Patent No.: US 8,125,423 B2
(45) Date of Patent: Feb. 28, 2012

(54) VOLTAGE CONTROL CIRCUIT, VOLTAGE CONTROL METHOD AND LIGHT CONTROL APPARATUS UTILIZING THE SAME

(75) Inventors: Takaaki Fuchikami, Kyoto (JP); Yoshikazu Fujimori, Kyoto (JP)

(73) Assignee: Rohm Co., Ltd. (JP)

( * ) Notice: Subject to any disclaimer, the term of this patent is extended or adjusted under 35 U.S.C. 154(b) by 1239 days.

(21) Appl. No.: 11/815,661

(22) PCT Filed: Feb. 6, 2006

(86) PCT No.: PCT/JP2006/302008
§ 371 (c)(1),
(2), (4) Date: Aug. 7, 2007

(87) PCT Pub. No.: WO2006/082972
PCT Pub. Date: Aug. 10, 2006

(65) Prior Publication Data
US 2009/0015889 A1    Jan. 15, 2009

(30) Foreign Application Priority Data
Feb. 7, 2005   (JP) ................................. 2005-031033

(51) Int. Cl.
*G09G 3/34* (2006.01)
(52) U.S. Cl. ............... 345/85; 345/84; 345/95; 345/204
(58) Field of Classification Search ............ 345/84, 345/87–89, 93–99, 204, 209–214; 349/36, 349/39, 42
See application file for complete search history.

(56) References Cited

U.S. PATENT DOCUMENTS

| 5,227,900 A | * | 7/1993 | Inaba et al. ...................... 345/97 |
| 5,436,742 A | * | 7/1995 | Tanaka et al. ................... 349/25 |
| 6,271,820 B1 | * | 8/2001 | Bock et al. ....................... 345/97 |
| 6,646,710 B2 | * | 11/2003 | Suzuki et al. ................. 349/172 |

FOREIGN PATENT DOCUMENTS

| JP | 4-29216 | 1/1992 |
| JP | 5-257103 | 10/1993 |

(Continued)

OTHER PUBLICATIONS

Office Action for Japanese Patent Application No. 2006-520565 dated Nov. 13, 2009 with English translation.

(Continued)

*Primary Examiner* — Quan-Zhen Wang
*Assistant Examiner* — Jennifer Nguyen
(74) *Attorney, Agent, or Firm* — Cantor Colburn LLP

(57) ABSTRACT

A voltage control circuit which can prevent the occurrence of imprint phenomenon is provided.

In a voltage control circuit which applies voltage to a pair of electrodes including a first and a second electrode, a control unit switches the voltage applied to the pair of electrodes, in response to an operation mode of this circuit.

In a normal mode, the control unit fixedly applies a first voltage to the first electrode and applies a data voltage of the first voltage or the second voltage to the second electrode, based on an instruction from the control unit.

In an inversion mode, the second voltage is fixedly applied to the first electrode, and the data voltage of the first voltage or second voltage is applied to the second electrode. The control unit switches the mode between the normal mode and the inversion mode, in a predetermined cycle.

15 Claims, 9 Drawing Sheets

FOREIGN PATENT DOCUMENTS

| | | |
|---|---|---|
| JP | 7-146657 | 6/1995 |
| JP | 8-201743 | 8/1996 |
| JP | 2001-337303 | 12/2001 |
| JP | 2002-297008 | 10/2002 |
| JP | 2003-243193 | 8/2003 |
| JP | 2004-22017 | 1/2004 |
| JP | 2005-85332 | 3/2005 |

OTHER PUBLICATIONS

International Search Report for International Application No. PCT/JP2006/302008 mailed May 16, 2006.

International Preliminary Report on Patentability for PCT/JP2006/302008 mailed Aug. 7, 2007.

* cited by examiner

US 8,125,423 B2

VOLTAGE CONTROL CIRCUIT, VOLTAGE CONTROL METHOD AND LIGHT CONTROL APPARATUS UTILIZING THE SAME

CROSS REFERENCE TO RELATED APPLICATIONS

This is a U.S. national stage of application No. PCT/JP2006/302008, filed on 6 Feb. 2006. Priority under 35 U.S.C. §119(a) and 35 U.S.C. §365(b) is claimed from Japanese Application No. 2005-031033, filed 7 Feb. 2005, the disclosure of which is also incorporated herein by reference.

BACKGROUND OF THE INVENTION

1. Field of the Invention

This invention relates to a light control apparatus and it particularly relates to a voltage control technology in which the voltage is applied to the ferroelectric substance.

2. Description of the Related Art

In recent years, a digital information recording system using the principle of hologram has been known as a large-capacity recording method (Patent Document 1, for instance).

The material that can be used for the spatial light modulator SLM of a hologram recording apparatus is, for instance, lead lanthanum zirconate titanate (hereinafter referred to as PLZT) or the like which has an electro-optical effect. PLZT is a transparent ceramic which has a composition of $(Pb_{1-y}La_y)(Zr_{1-x}Ti_x)O_3$. An electro-optical effect is a phenomenon in which an electric field applied to a substance causes polarization in the substance with a resulting change in its refractive index. Using the electro-optical effect, the phase of light can be switched by turning the applied voltage on and off. Accordingly, a light modulating material with an electro-optical effect can be applied to the optical shutter of a spatial light modulator SLM or the like.

In applications to these optical shutter and other devices, bulk PLZT has been widely used conventionally (Patent Document 2). However, it is difficult for the optical shutters using bulk PLZT to meet the demands for miniaturization or higher integration or the demands for lowered operating voltage or lowered cost. Besides, the bulk method involves a process of treating at high temperatures of 1000° C. or above after the mixing of material metal oxides, and hence, if applied to a device forming process, it may place many constraints on the selection of materials, the structure of the device and the like.

Under these circumstances, there have been attempts at applying a thin film of PLZT formed on a base material, instead of bulk PLZT, to light control devices. Described in Patent Document 3 is a display apparatus for which a PLZT film is formed on a glass or other transparent substrate and comb-shaped electrodes are placed thereon. This display apparatus has such a structure that a polarizing plate is provided on each of both faces of a display substrate with a PLZT film formed thereon. Here, the electrode terminal of each pixel is connected with an external drive circuit, so that desired pixels are driven and thus a desired display can be produced by the transmitted light from a light source provided on one face of the display substrate.

[Patent Document 1]
Japanese Patent Application Laid-Open No. 2002-297008.
[Patent Document 2]
Japanese Patent Application Laid-Open No. Hei05-257103.
[Patent Document 3]
Japanese Patent Application Laid-Open No. Hei07-146657.

The ferroelectric substance such as PLZT used in the light modulating material for the above-mentioned spatial light modulator is known to have an imprint phenomenon. This imprint phenomenon is a phenomenon where the amount of polarization produced in the ferroelectric substance, as a result of the electric field being continuously applied to the ferroelectric substance in the same direction, is held in memory. When a light control device is composed by use of the ferroelectric substance such as PLZT, continuously applying the electric field in the same direction causes an imprint phenomenon, so that the change in refractive index is shifted gradually. This shift of change in refractive index causes a problem of deteriorating the modulation accuracy of a spatial light modulator.

SUMMARY OF THE INVENTION

The present invention has been made in view of the foregoing circumstances and an object thereof is to provide a voltage control circuit which can change a voltage-applying direction for electrodes and a light control apparatus which stabilizes the modulation accuracy.

One embodiment of the present invention relates to a voltage control circuit. This voltage control circuit applies voltage to a pair of electrodes including a first and a second electrode, and it comprises: a control unit which switches a direction of voltage applied to the pair of electrodes, in response to an operation mode of this circuit; and a voltage applying unit which applies a first voltage or a second voltage, set lower than the first voltage, to the first and the second electrode, respectively, based on an instruction from the control unit. In a normal mode, the voltage applying unit applies fixedly the first voltage to the first electrode and applies a data voltage of the first voltage or second voltage to the second electrode, whereas in an inversion mode the voltage applying unit applies fixedly the second voltage to the first electrode and inverts the data voltage of the first voltage or second voltage and then applies it to the second electrode.

According to this embodiment, the voltage applied to a pair of electrodes can be turned into a negative phase in the normal mode and the inversion mode. Hence, the two modes can be switched in a flexible manner.

A pair of electrodes to which a voltage is to be applied may be a pair of electrodes to apply an electric field to a ferroelectric substance.

In such a case, the direction of the electric field applied to the ferroelectric substance in the normal mode is opposite to that in the inversion mode, so that the imprint phenomenon can be restricted.

The control unit may switch in a predetermine cycle between the normal mode and the inversion mode.

The control unit may include an exclusive OR circuit to which a mode control voltage that switches a mode between the normal mode and the inversion mode and a data voltage specifying a voltage to be applied to the pair of electrodes are inputted. The voltage applying unit may apply the mode control voltage to the first electrode and may apply a voltage outputted from the exclusive-OR circuit to the second electrode.

According to this embodiment, in the normal mode the first voltage is applied to the first electrode, whereas the first and the second voltage according to a data signal are applied to the second electrode. In the inversion mode, the second voltage is applied to the first electrode and the first and the second voltage according to a data signal are applied to the second electrode, so that the direction of electric field that occurs between the electrodes can be switched.

The voltage applying unit may include a first buffer and a second buffer provided on paths through which voltages are applied to the first electrode and the second electrode, respectively.

The buffer circuits can improve the current supply capacity for a capacitor constituted by a pair of electrodes.

The first and the second buffer circuit may each include an inverter circuit. In this case, the voltages corresponding to the high level and low level of an inverter circuit are applied respectively to the first and the second electrode as the first and the second voltage. Thus, the voltage applied to a pair of electrodes can be stabilized.

If even-numbered stages of inverter circuits are provided, the voltage can be applied to the first and the second electrode without going through the logic inversion.

The first and the second buffer circuit may be a feedback amplifier including an operational amplifier.

Even when an inverting or noninverting amplifier is formed by use of an operational amplifier, the current supply capacity can also be enhanced. The buffer circuit may be an operational amplifier in which an inverting input terminal and an output terminal are shunted. A voltage follower circuit is formed by the provision of an operational amplifier, thus improving the current supply capacity.

The voltage applying unit may include a first switch and a second switch, which turn on and off the applying of voltage, provided on paths through which voltages are applied to the first electrode and the second electrode, respectively. In this case, the voltage is applied to the pair of electrodes during only a period in which the switch is turned on, so that the voltage can be controlled more accurately.

The voltage applying unit may include a first logic operation element and a second logic operation element provided respectively on paths through which voltages are applied to the first electrode and the second electrode. A voltage to be applied to the first electrode may be inputted to a first input of the first logic operation element, and an instruction signal that instructs the applying of voltage may be inputted to a second input thereof; and a voltage to be applied to the second electrode may be inputted to a first input of the second logic operation element, and the instruction signal may be inputted to a second input thereof.

The "logic operation element" may be a NAND, NOR, AND, OR circuit or other circuits.

According to this embodiment, the same voltage is applied to the first and the second electrode except during a period in which the applying of voltage to the pair of electrodes is instructed by an instruction signal. Hence, the stability of a circuit can be enhanced.

The second voltage may be ground voltage.

Another embodiment of the present invention relates to a light control apparatus. This apparatus comprises: a substrate; a first reflection layer formed on the substrate; a light modulating film, formed by a ferroelectric substance capable of controlling refractive index by an electric field applied, which is provided on the first reflection layer; a pair of electrodes which contains a first electrode and a second electrode with which to apply an electric field; and an above-described voltage control circuit which applies a voltage to the pair of electrodes.

According to this embodiment, the electric field applied to a light modulating film can be inverted according to the switching of the mode. Thus, the imprint phenomenon can be reduced and the modulation accuracy of a light control apparatus can be maintained.

The light modulating film may be an electro-optical material whose refractive index varies in proportion to the square of an electric field applied.

The electro-optical material may be lead zirconate titanate or lead lanthanum zirconate titanate.

The voltage control circuit further comprises a transparent electrode formed on an upper surface of the light modulating film. The transparent electrode and the first reflection layer form the pair of electrodes. In this case, the pair of electrodes are so formed as to sandwich a light modulating film therebetween.

The pair of electrodes may be arranged in a matrix in plurality, and the voltage control circuit may be provided in plurality for each of the pair of electrodes.

A plurality of voltage control circuits may be such that the mode is switched in units of column or row.

The pair of electrodes may be arranged in a matrix in plurality; the voltage control circuit may be provided for each row of a matrix; and the respective pair of electrodes may be connected with the voltage control circuit provided on the same row as the pair of electrodes, via switches provided per pair of electrodes. In this case, the switch is turned on for each column of a matrix, so that the voltage can be applied, in sequential order, to all the pairs of electrodes.

Still another embodiment of the present invention relates to a voltage control method. This voltage control method is a method for controlling a voltage applied to a pair of electrodes including a first and a second electrode, and it is characterized in that in a normal mode a first voltage is fixedly applied to the first electrode, and either the first voltage or a second voltage, set lower than the first voltage, is applied to the second electrode, whereas in an inversion mode the second voltage is fixedly applied to the first electrode, and the first voltage or the second voltage is applied to the second electrode.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

A light control apparatus according to a first embodiment of the present invention will be described in outline. This light control apparatus is used, for instance, as a spatial light modulator SLM in a hologram recording/reproducing apparatus.

Figure 1:
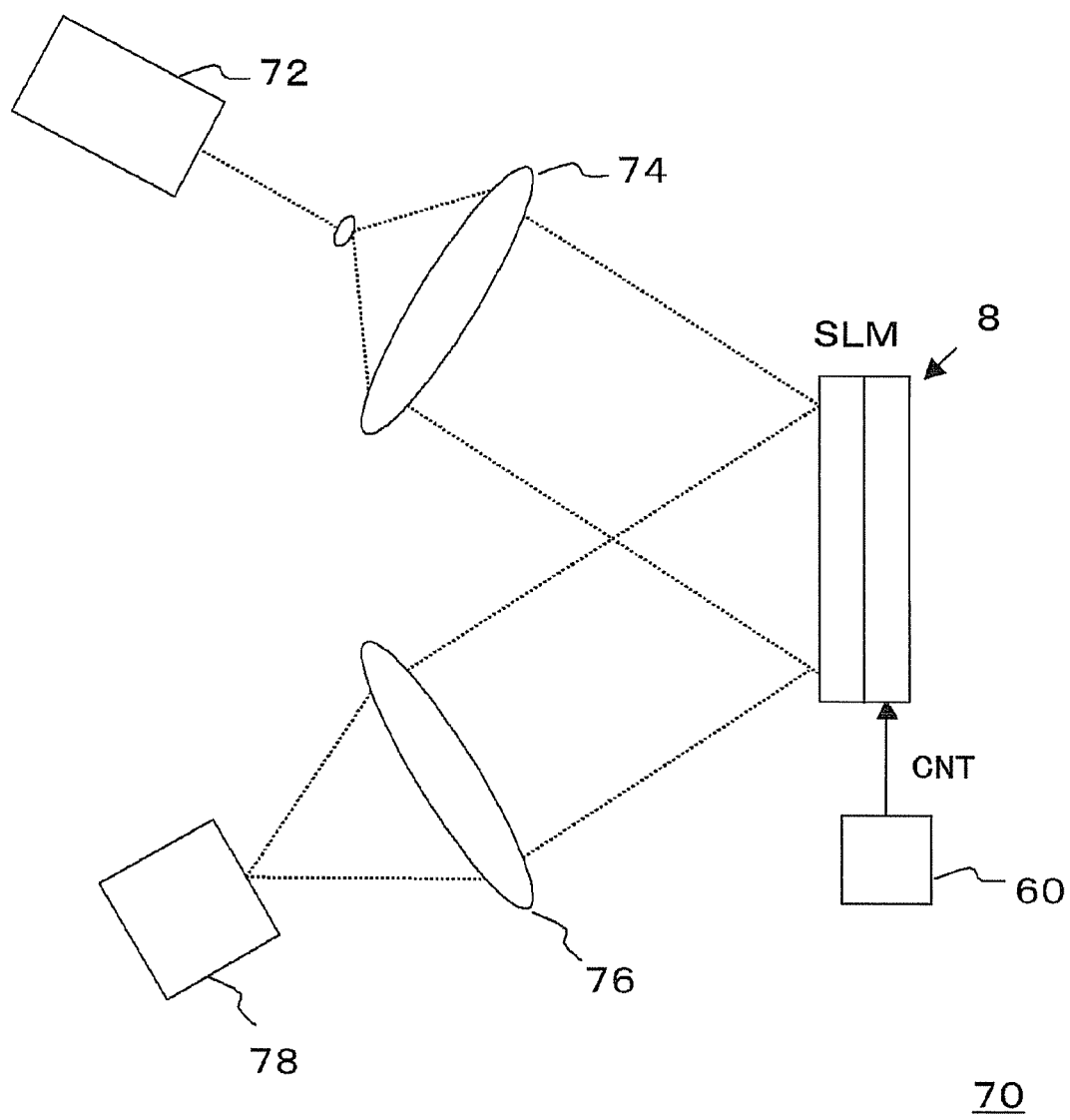
FIG. 1 is an illustration showing a hologram recording apparatus wherein a light control apparatus according to a first embodiment is used as a spatial light modulator SLM.

FIG. 1 is an illustration showing a hologram recording apparatus wherein a light control apparatus according to the present embodiment is used as a spatial light modulator SLM. The hologram recording apparatus 70 includes a light control apparatus 8, a control unit 60, a laser light source 72, a beam expander 74, a Fourier transform lens 76, and a recording medium 78.

In the hologram recording apparatus 70, laser light emitted from the laser light source 72 is split into two beams of light by a beam splitter (not shown). One of the beams of light, which is used as reference light, is led into recording medium 78. The other of the beams of light undergoes an enlargement of beam diameter by the beam expander 74 and is irradiated to a spatial light modulator SLM (light control apparatus 8) as parallel light.

The light control apparatus 8 has pixels arranged in a matrix and is so configured that the reflectance of each pixel changes independently. The control unit 60 controls the reflectance of each pixel of the light control apparatus 8 by the use of a control signal CNT. The light irradiated to the spatial light modulator SLM is reflected from the spatial light modulator SLM as signal light which has different intensities for different pixels. This signal light is subjected to a Fourier transform as it passes through the Fourier transform lens 76 and is converged within the recording medium 78. Inside the recording medium 78, the light paths of the signal light containing a hologram pattern and the reference light cross each other to form an optical interference pattern. The whole interference pattern is now recorded as a change in refractive index (refractive index grating) in the recording medium 78.

Figure 2A:
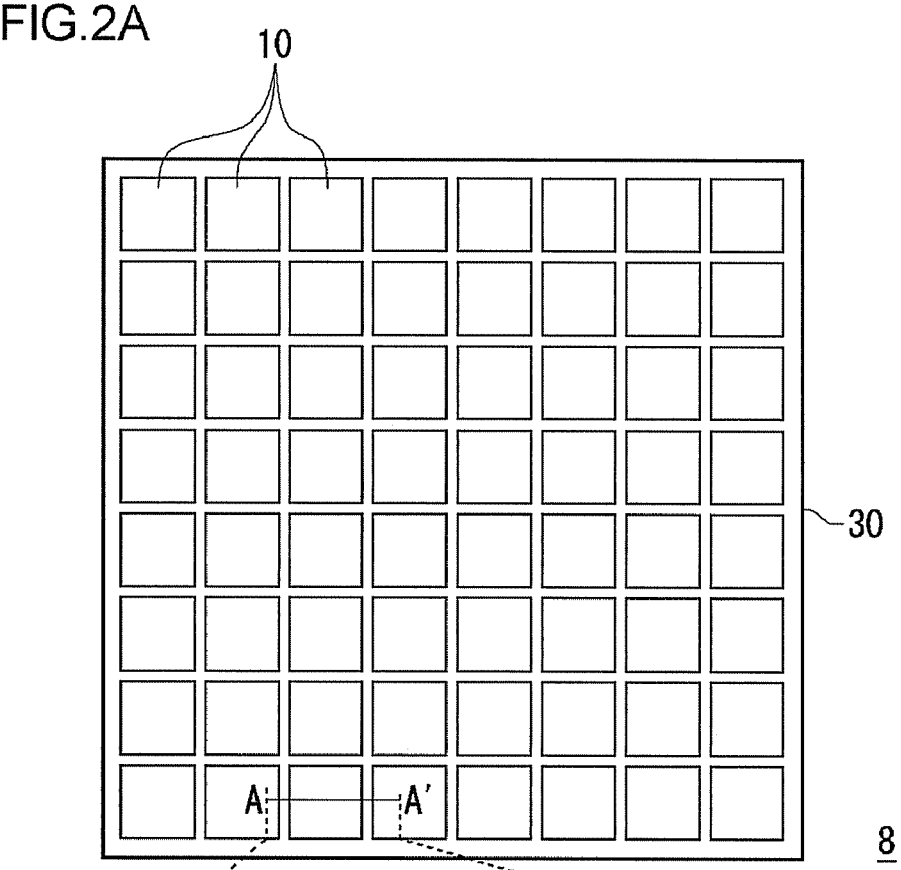
FIGS. 2A and 2B are diagrams showing a light control apparatus according to a first embodiment.

FIG. 2A shows a plan view of a light control apparatus 8 according to the present embodiment. The light control apparatus 8 is provided with a plurality of pixels 10 which are arranged two-dimensionally in eight rows and eight columns on a substrate 30. Each pixel 10 is structured in a size of about 20 μm×20 μm. Inputted to each pixel 10 is a control signal CNT outputted from the control unit 60 of FIG. 1.

Figure 2B:
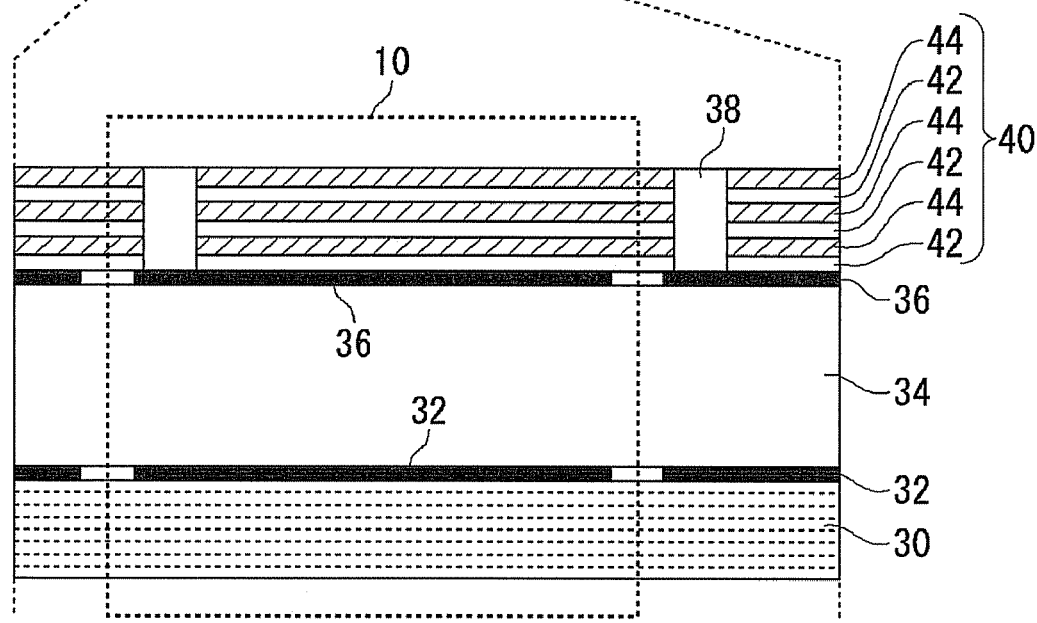

FIG. 2B shows an A-A' cross-sectional view of a light control apparatus shown in FIG. 2A. The light control apparatus 8 includes a substrate 30, a first reflection layer 32, a light modulating film 34, a transparent electrode 36, a wiring 38 and a second reflection layer 40.

The light control apparatus 8 according to the present embodiment is formed on the substrate 30. Glass, silicon, or the like with a flat surface may preferably be used as material for this substrate 30.

The first reflection layer 32 is formed on the substrate 30. A metallic material, such as Pt, may preferably be used as material for the first reflection layer 32. The thickness of the first reflection layer 32 is set to about 200 nm. According to the present embodiment, the first reflection layer 32 is formed of Pt, and this first reflection layer 32 functions as an electrode for applying an electric field to the light modulating film 34 as will be described later.

When the first reflection layer 32 is formed of Pt, the reflectance of the first reflection layer 32 is about 60% to 80%.

The light modulating film 34 is provided on the top surface of the first reflection layer 32. To be selected as the material for this light modulating film 34 is a solid electro-optical material whose refractive index changes with the electric field applied. Although such electro-optical materials that can be used include PLZT, PZT, LiNbO$_3$, GaA-MQW, SBN(Sr,Ba)Nb$_2$O$_6$) and the like, PLZT, in particular, is preferably used. The thickness t of the light modulating film 34, which is determined according to the incident angle and wavelength of entering light, should preferably be formed in a range of 500 nm to 1500 nm when the incident light is, for instance, a red light near 650 nm. As will be described later, an electric field applied to the light modulating film 34 is applied in the thickness direction thereof, so that if the film thickness is 1500 nm or more, it will be difficult to apply an electric field that can produce a sufficient change in refractive index. Also, if the film thickness is 500 nm or less, then it will not be possible to obtain a sufficient optical film thickness change Ant.

The transparent electrode 36 is provided on the top surface of the light modulating film 34. The transparent electrode 36 may, for instance, be formed of ITO (Indium Tin Oxide), ZnO, IrO$_2$, or the like. When the transparent electrode 36 is formed of ITO or ZnO, the thickness thereof shall be about 100 nm to 150 nm. When it is formed of IrO$_2$, the film thickness is preferably thinner, that is, about 50 nm, for instance. This transparent electrode 36 has a trade-off relationship between resistance and transmittance, so that the thickness thereof may be determined experimentally.

This transparent electrode 36 is formed in such a manner as to be arranged in a matrix for all pixels 10 respectively.

The second reflection layer 40 is formed on the top surface of the transparent electrode 36. This second reflection layer 40 is comprised of a dielectric multilayer film, which is a stack of alternating first dielectric film 42 and second dielectric film 44 having different refractive indices. A combination of materials that can be used for the first dielectric film 42 and second dielectric film 44 may be SiO$_2$ (n=1.48) and Si$_3$N$_4$ (n=2.0).

If the dielectric multilayer film is to be formed of silicon dioxide films and silicon nitride films, it will be possible to use exactly the same manufacturing process and manufacturing equipment of silicon semiconductor integrated circuits.

The dielectric multilayer film may be formed by a plasma CVD (Chemical Vapor Deposition) method. The SiO$_2$ film may be grown in an ambience of TEOS and $O_2$ at the temperature of 200° C. and the $Si_3N_4$ film may be grown suitably in an ambience of $SiH_4$ and $NH_3$ at the temperature of 200° C.

The dielectric multilayer film may also be formed by an ion beam sputtering method.

The thicknesses t1 and t2 respectively of the first dielectric film 42 and second dielectric film 44 are so designed as to be ¼ of the wavelength of light entering the light control apparatus 8. That is, if the wavelength of light entering the light control apparatus 8 is λ and the refractive index of the dielectric film is n, the thickness t for each layer of the dielectric films is so adjusted as to be $t=\lambda/(n\times 4)$.

For example, suppose that a red laser light of wavelength λ=633 nm is used for a light control apparatus 8, then the thickness t1 of the first dielectric film 42 will approximately be $t=633/(4\times 1.48)=106$ nm where the material used is $SiO_2$ (n=1.48). Likewise, the thickness t2 of the second dielectric film 44 will approximately be $t2=633/(4\times 2)=79$ nm where the material used is $Si_3N_4$ (n=2.0) It is not always necessary that the thicknesses t1 and t2 of the dielectric films constituting the second reflection layer 40 be designed to be exactly λ/4.

As material for the dielectric film, $TiO_3$ (n=2.2) may be used instead of silicon nitride film. In this case, the thickness t2 of the second dielectric film 44 is set approximately to $t2=633/(4\times 2.2)=72$ nm.

In FIG. 2B, the reflectance R2 of light entering a second reflection layer 40 from a light modulating film 34 is so designed as to be equal to the reflectance R1 of light entering a first reflection layer 32 from the light modulating film 34. The reflectance R1 is determined by the metallic material used for the first reflection layer 32, and is 60 to 80% when Pt is selected.

At this time, therefore, the reflectance R2 is also designed to be 60 to 80%. The reflectance R2 of the second reflection layer 40 can be adjusted by the materials and thicknesses of the first dielectric films 42 and the second dielectric films 44. According to the present embodiment, the second reflection layer 40, as shown in FIG. 2, is a stack of alternating three layers each of the first dielectric films 42 and the second dielectric films 44. In the second reflection layer 40, the stacking order of the first dielectric films 42 and the second dielectric films 44 may be reversed. Also, a third dielectric film may be further stacked in order to fine-adjust the reflectance R2.

The second reflection layer 40 has openings, and the transparent electrode 36 is led to the outside through vias and wiring 38. As material for the wiring 38, Al or the like is used preferably.

On the top surface of the wiring 38, a protective film may further be formed.

In the present embodiment, a transparent electrode 36 and a first reflection layer 32 form a pair of electrodes. The potentials of the first reflection layer 32 and the transparent electrode 36 of each pixel are controlled by a control signal CNT. This control signal CNT is the voltage equivalent to a data voltage DATA and a control signal MODE described later.

A description will be given of an operation of a light control apparatus 8 configured as described above.

Figure 3:
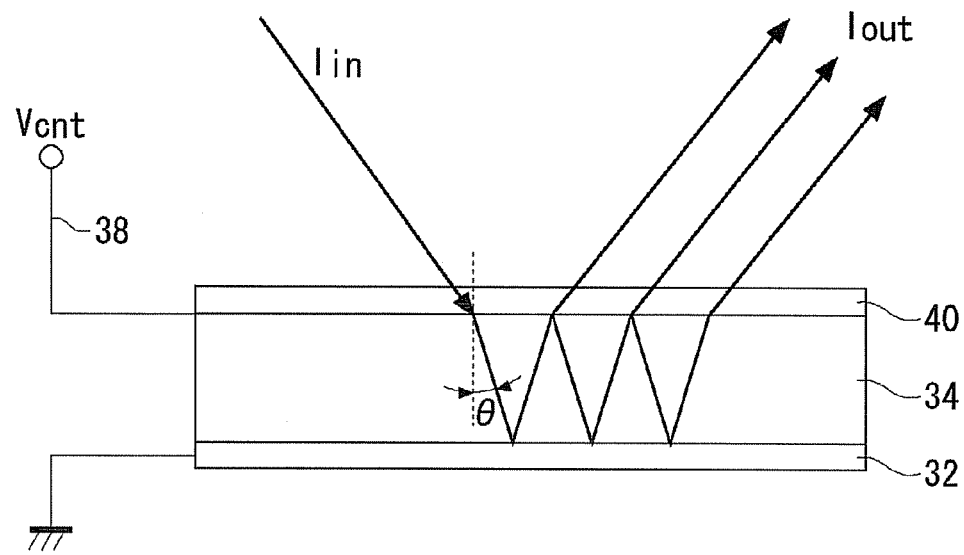
FIG. 3 illustrates schematically a state of operation of one pixel of the light control apparatus.

FIG. 3 illustrates schematically a state of operation of one pixel of the light control apparatus 8. In the figure, the same components as those in FIG. 2 are denoted by the same reference numerals. Also, for simplicity, components, such as a transparent electrode 36, are omitted.

From above the light control apparatus 8, laser light of intensity Iin is introduced. A first reflection layer 32, a light modulating film 34 and a second reflection layer 40 of the light control apparatus 8 constitute a Fabry-Perot resonator, and part of the incident light is entrapped therewithin and part thereof is reflected. If the intensity of incident laser light is Iin and the intensity of laser light reflected by the light control apparatus 8 is Iout, the reflectance R of the light control apparatus 8 will be defined as R=Iout/Iin.

Figure 4:
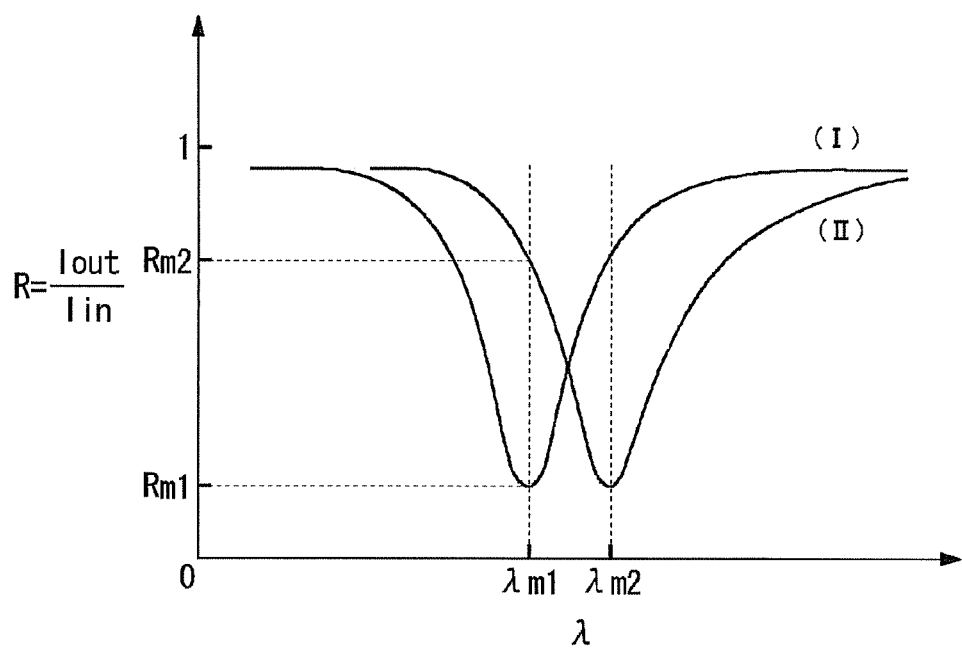
FIG. 4 shows a relationship between a wavelength λ of light incident on a light control apparatus and a reflectance R.

FIG. 4 shows a relationship between the wavelength λ of light incident on a light control apparatus 8 and the reflectance R thereof.

The Fabry-Perot resonator constituted by a first reflection layer 32, a light modulating film 34 and a second reflection layer 40 has a resonance wavelength of $\lambda m=2nt\cos\theta/m$, where m is a degree, n is the refractive index of the light modulating film 34, t is the thickness of the light modulating film 34, and λ is the incident angle of laser light. As shown in FIG. 4, the reflectance R of the light control apparatus 8 takes the minimum value at the resonance wavelength λm.

As described above, the refractive index n of the light modulating film 34 is dependent on the electric field applied to the pair of electrodes. Now, if the first reflection layer 32 is at ground potential and a control voltage Vcnt is applied to the not-shown transparent electrode 36, an electric field E=Vcnt/t will be applied to the light modulating film 34 in the thickness direction. Between the variation Δn in the refractive index n of the light modulating film 34 and the applied electric field E, there exists a relationship $\lambda n=\frac{1}{2}\times n^3\times R\times E^2$, where R is an electro-optical constant (Kerr constant).

(I) in FIG. 4 represents reflection characteristics when the control voltage Vcnt is not applied.

Now, if a voltage V1 as the control voltage Vcnt is applied to the transparent electrode 36 of each pixel 10, the refractive index of the light modulating film 34 will change and the resonance wavelength of the resonator will shift from λm1 to λm2. The reflection characteristics at this time is represented by (II) in FIG. 4.

If the wavelength of laser light incident on the light control apparatus 8 is λm1, then changing the control voltage Vcnt from ground potential to a voltage V1 will cause a shift of the resonance wavelength and consequently a change of the reflectance of the light control apparatus 8 from Rm1 to Rm2.

Here, the ratio of the reflectance Ron when no voltage is applied to the reflectance Roff when a voltage is applied is defined as an on-off ratio. When the intensity Iin of incident light is constant, the intensity Iout of reflected light is proportional to the reflectance. Accordingly, a larger on-off ratio means a better accuracy with which the intensity Iout of reflected light can be controlled.

The closer the reflectance R1 at the first reflection layer 32 and the reflectance R2 at the second reflection layer 40 are to each other, the lower the reflectance R of the light control apparatus 8 at resonance wavelength λm will be. Hence, by designing the reflectance R1 at the first reflection layer 32 and the reflectance R2 at the second reflection layer 40 to be equal to each other by adjusting the number of layers and materials of the dielectric multilayer film of the second reflection layer 40 as described earlier, the reflectance R1 at "off" time can be set low and the on-off ratio can be set high.

In this manner, in the light control apparatus 8 according to the present embodiment, an optical switching device that controls the intensity of reflected light Iout by changing the reflectance can be realized by changing the electric field to be applied to the light modulating film 34. Since the phase of reflected light can also be controlled by changing the refractive index of the light modulating film 34, the device can be used suitably for a hologram recording apparatus or the like.

This light control apparatus 8 being of a reflection-type structure, it is not necessary to have the incident light Iin transmitted through the substrate 30. Consequently, this light control apparatus 8 can have an improved light utilization efficiency, compared with the conventional transmissive-type light control apparatus.

Light utilization efficiency improves because the use of a transparent electrode 36 as the upper electrode for applying an electric field to the light modulating film 34 can raise the aperture ratio and minimize the diffraction. The improvement in light utilization efficiency means the possibility of lowering the intensity Iin of incident laser light, which makes it possible to reduce power consumption.

Further, in the light control apparatus 8 according to the present embodiment, the transparent electrode 36 is formed on top of the light modulating film 34, and the second reflection layer 40 is formed on top thereof. As a result, the distance between the upper electrode and the lower electrode can be made shorter than when a transparent electrode 36 is formed on top of the second reflection layer 40, so that the electric field E applied to the light modulating film 34 can be raised. From a different viewpoint, this means the possibility of lowering the voltage to be applied between the electrodes to apply the same electric field, which makes it possible to operate the light control apparatus 8 at low voltage.

In the light control apparatus 8 according to the present embodiment, the intensity Iout of reflected light is changed by controlling the reflectance R, so that it does not need a deflection plate or an analyzer and has an advantage of high light utilization efficiency.

Figures 5, 6:
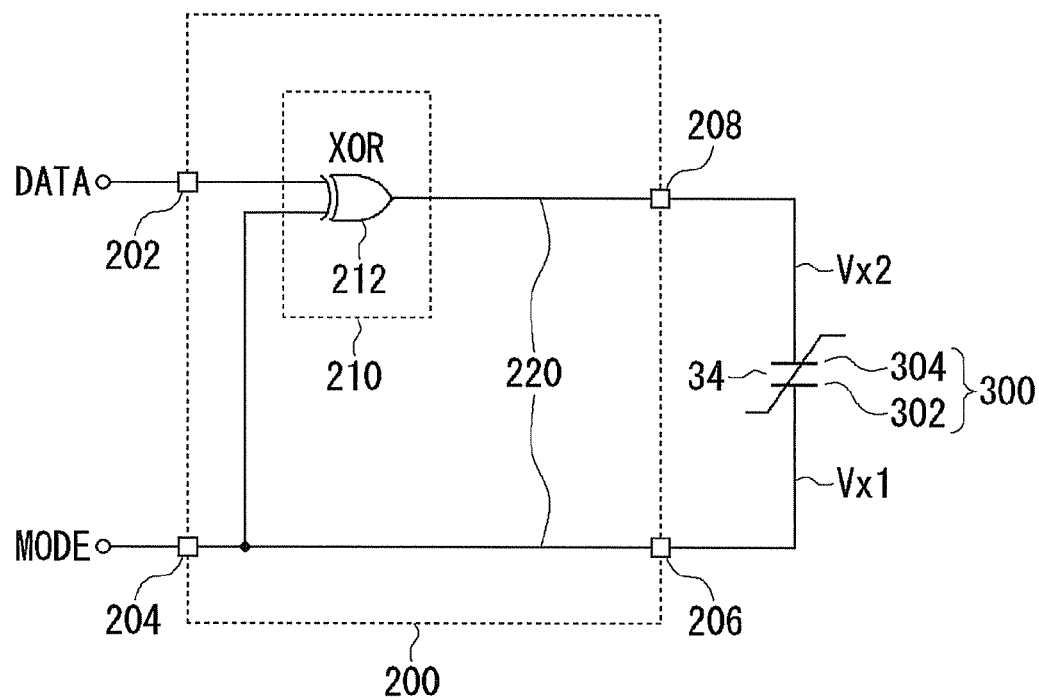
FIG. 5 is a diagram showing a structure of a voltage control circuit which applies the voltage to a pair of electrodes of a light modulating film in the light control apparatus of FIG. 4.
FIG. 6 is a diagram showing an operation of a voltage control circuit according to a first embodiment.

FIG. 5 illustrates a structure of a voltage control circuit 200 which applies the voltage to a pair of electrodes 300 of a light modulating film 34, in the light control apparatus 8 of FIG. 4. The light modulating film 34 is interposed between a first electrode 302, which is a lower surface electrode, and a second electrode 304, which is an upper surface electrode. The first electrode 302 and the second electrode 304 correspond to the first reflection electrode 32 and the transparent electrode 36 of FIG. 2, respectively.

This voltage control circuit 200 is provided for each pixel.

The voltage control circuit 200 is comprised of a data input terminal 202 and a mode control terminal 204, as input terminals, and also a first output terminal 206 and a second output terminal 208 as output terminals.

Data voltage DATA specifying a voltage to be applied to the pair of electrodes 300 is inputted to the data input terminal 202. This data voltage DATA is a signal which takes either of two values which are high level VH and low level VL.

Mode control voltage MODE is inputted to the mode control terminal 204. The mode control voltage MODE is a signal by which to switch an operation mode of this voltage control circuit 200, and it becomes a normal mode at the high level VH whereas it becomes an inversion mode at the low level VL.

The first output terminal 206 outputs a voltage applied to the first electrode 302. The second output terminal 208 outputs a voltage applied to the second electrode 304. The voltages applied to the first electrode 302 and the second electrode 304 are denoted by voltage Vx1 and voltage Vx2, respectively.

Two operation modes which are the normal mode and the inversion mode are switched in the voltage control circuit 200 according to the present embodiment. In the normal mode, the voltage is applied in a range of Vx1≧Vx2 whereas in the inversion mode, the voltage is applied in a range of Vx1≦Vx2.

The control unit 210 switches the voltage applied to the pair of electrodes 300 according to the operation mode specified by the mode control voltage MODE of this voltage control circuit 200.

A voltage applying unit 220 applies either the high level VH or low level VL to the first electrode 302 and the second electrode 304, respectively, based on the instruction by the control unit 210.

The control unit 210 includes an exclusive-OR circuit 212. The mode control voltage MODE and the data voltage DATA are inputted to this exclusive-OR circuit 212. The exclusive-OR circuit 212 outputs the exclusive OR of two input signals.

The voltage applying unit 220 applies the mode control voltage MODE to the first electrode 302 via the first output terminal 206. It applies the voltage outputted from the exclusive-OR circuit 212 to the second electrode 304 via the second output terminal 208.

A description will be given of an operation of a voltage control circuit 200 configured as above.

FIG. 6 illustrates an operation of a voltage control circuit 200 according to the present embodiment.

When the mode control voltage MODE is at high level VH, it becomes a normal mode. This mode control voltage MODE is directly applied to the first electrode 302 by the voltage applying unit 220, and the voltage is such that Vx1=VH. During the period in which the voltage is being applied to the pair of electrodes 300, the mode control voltage MODE takes a constant value and the potential of the first electrode 302 is fixed at the high level.

When, in this state, the low level VL is inputted as a data voltage DATA, the output of the exclusive-OR circuit 212 becomes the high level VH. Conversely, when the high level VH is inputted as a data voltage DATA, the output of the exclusive-OR circuit 212 becomes the low level VL.

In this manner, in the normal mode the voltage control circuit 200 applies fixedly the high level VH, which is the first voltage, to the first electrode 302. It inverts a data voltage DATA of high level VH or low level VL and applies the inverted data voltage DATA thereof to the second electrode 304.

When the mode control voltage MODE is of low level VL, it becomes an inversion mode. This mode control voltage MODE is directly applied to the first electrode 302 by the voltage applying unit 220, and the voltage is such that Vx1=VL. During the period in which the voltage is being applied to the pair of electrodes 300, the mode control voltage MODE takes a constant value and the potential of the first electrode 302 is fixed at the low level VL.

When, in this state, the low level VL is inputted as a data voltage DATA, the output of the exclusive-OR circuit 212 becomes the low level VL. Conversely, when the high level VH is inputted as a data voltage DATA, the output of the exclusive-OR circuit 212 becomes the high level VH.

In this manner, in the inversion mode the voltage control circuit 200 applies fixedly the low level VL, which is the first voltage, to the first electrode 302. It directly applies the high level VH or low level VL to the data voltage DATA.

Interelectrode voltage applied to the pair of electrodes 300 is defined by ΔVx=Vx1−Vx2.

In the voltage control circuit 200 according to the present embodiment, the interelectrode voltage ΔVx of 0 or (VH-VL) is applied in the normal mode. Since VH>VL here, 0V or a positive voltage of (VH-VL) is applied to the light modulating film 34.

Conversely, 0V or a voltage of (VL-VH) is applied to the interelectrode voltage ΔVx in the inversion mode. Since VH>VL, 0V or a negative voltage is applied to the light modulating film 34.

In order to further demonstrate the effects by the voltage control circuit 200 according to the present embodiment, a description is given of an imprint phenomenon that occurs in the light modulating film 34 which is a ferroelectric substance.

Figure 7A:
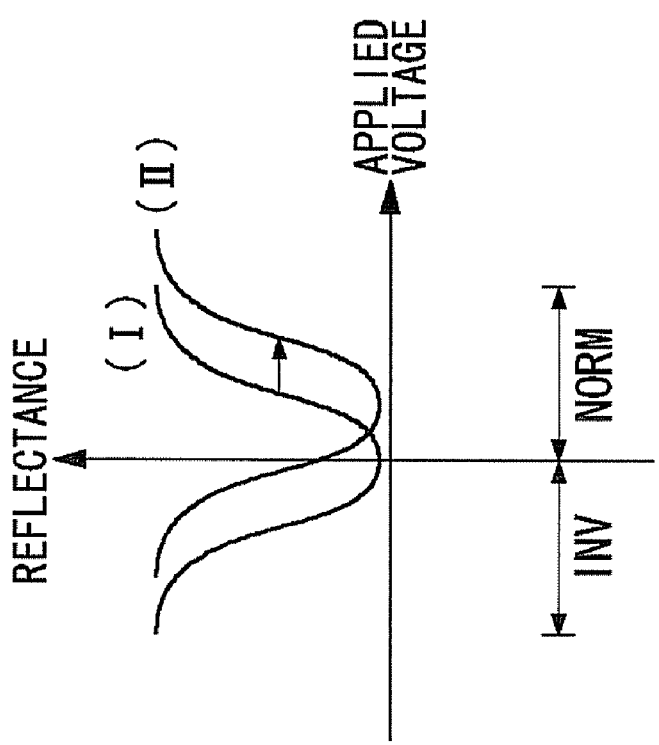
FIGS. 7A and 7B show a relationship between a voltage applied to the ferroelectric substance PLZT of a light modulating film and the amount of polarization as well as the reflectance of a light control apparatus.
Figure 7B:
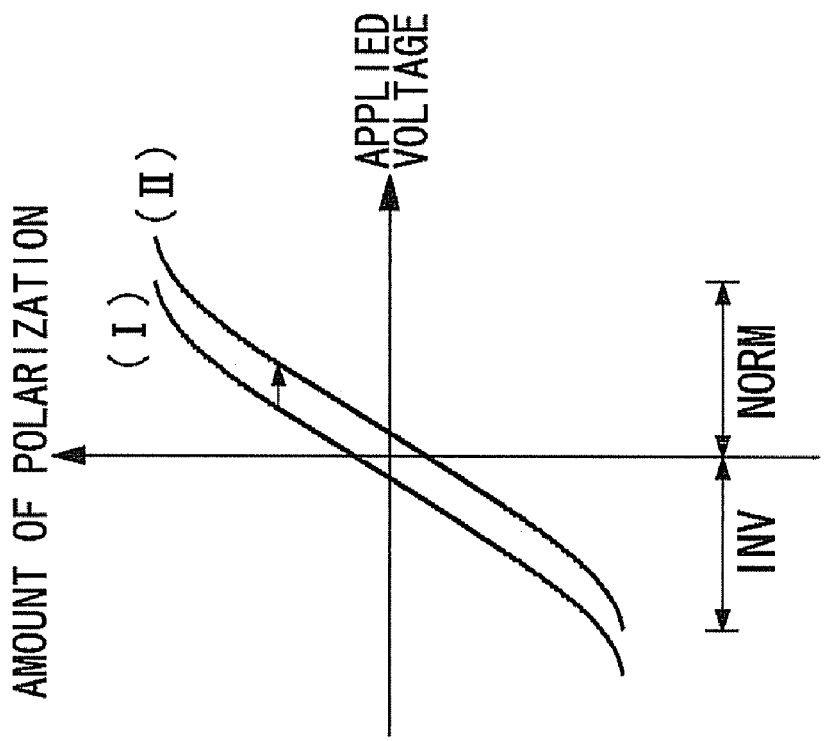

FIGS. 7A and 7B show a relationship between a voltage applied to the ferroelectric substance PLZT of the light modulating film 34 and the amount of polarization as well as the reflectance. FIG. 7A shows a relationship between the amount of polarization and the applied voltage, and a characteristic represented by (I) is exhibited in an initial state. If the electric field in the same direction is applied continuously to this light modulation film 34, the amount of polarization is stored in memory and an imprint phenomenon, in which the characteristic is shifted to that represented by (II), occurs. FIG. 7B shows a relationship between the reflectance of the spatial light modulator SLM 108 and the voltage applied. Suppose that the light modulating film 34 is formed by PLZT whose reflectance varies proportionally to the square of applied voltage. Even if the direction at which the voltage is applied is reversed in the initial state indicated by (I), the same reflectance is obtained for the reflectance of the spatial light modulator SLM 108. When the shift in the amount of polarization occurs due to the imprint phenomenon shown in FIG. 7A, the reflectance of the spatial light modulator SLM 108 with the same voltage being applied changes, so that the modulation accuracy degrades.

Figure 8:
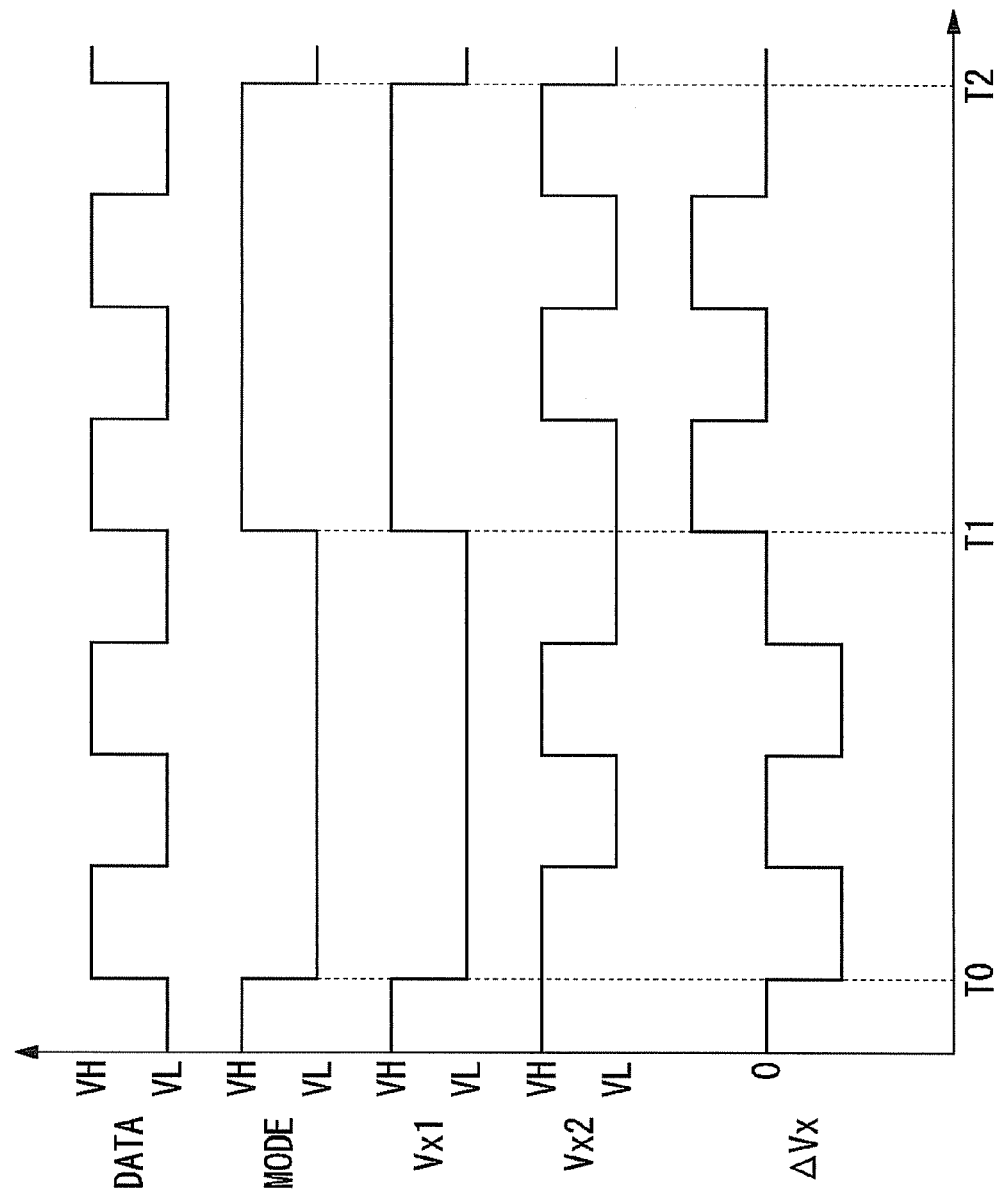
FIG. 8 is a timing chart showing an operating state of a voltage control circuit.

FIG. 8 is a timing chart showing an operating state of the voltage control circuit 200. For illustrative purposes the data voltage DATA repeats the high level VH and the low level VL but actually it is a signal that varies according to data.

At time T0 to T1 the mode control voltage MODE is low-level VL and operates as an inversion mode. During this time, the voltage Vx2 of the second electrode 304 becomes a voltage where the data voltage DATA is inverted. As a result, the voltage $\Delta Vx=Vx1-Vx2$, which is the voltage applied to the pair of electrodes 300, becomes 0V or a negative voltage.

At time T1 to T2 the mode control voltage MODE is high-level VH and operates as a normal mode. During this time, the second voltage Vx2 of the second electrode 304 is equal to the data voltage DATA.

In this manner, in the voltage control circuit 200 according to the present embodiment, the mode is switched, as appropriate, between the normal mode and the inversion mode. As a result, in the normal mode the voltage is applied to the light modulating film 34 in a range represented by NORM in FIG. 7B whereas in the inversion mode, it is applied thereto in a range represented by INV therein. Since switching between the normal mode and the inversion mode reverses the direction of electric field applied to the light modulating film 34, the occurrence of imprint phenomenon can be suppressed. Though the normal mode and the inversion mode are switched for every four data in FIG. 8, the switching may be made per data or in other cycles.

There are various modifications conceivable for the configuration of the voltage control circuit 200, with the voltage control circuit 200 as a basic circuit. In what is to follow, such modifications will be described.

(First Modification)

Figure 9:
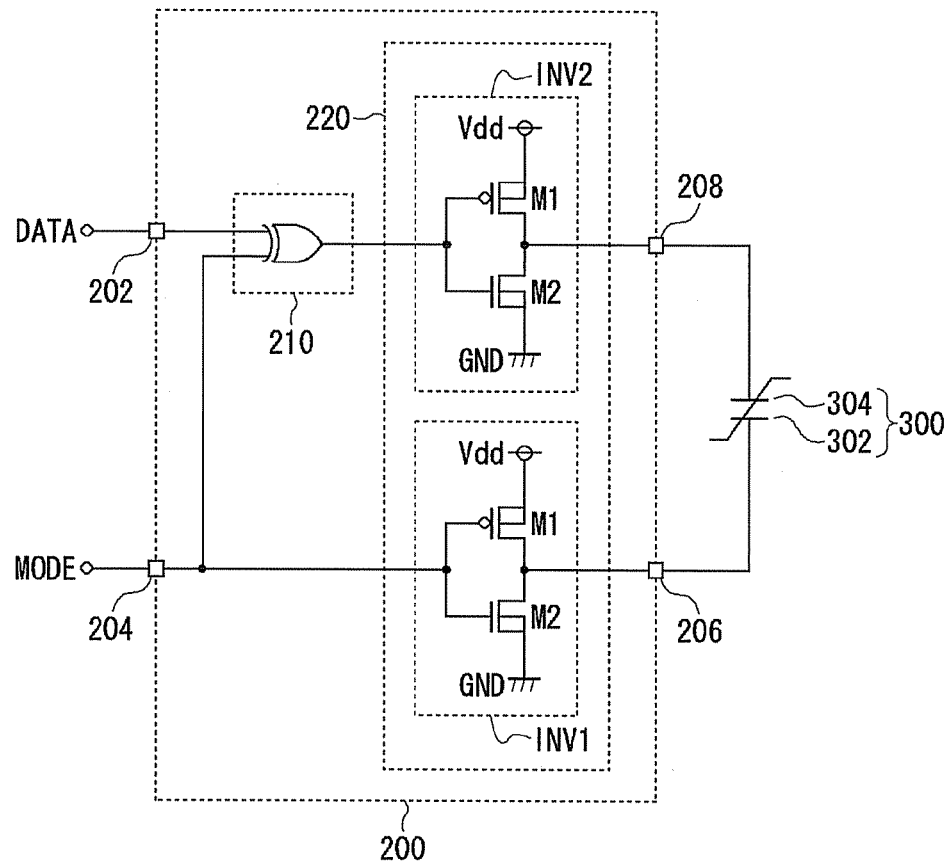
FIG. 9 is a diagram showing a first modification of a voltage control circuit.

FIG. 9 is a diagram showing a first modification of the voltage control circuit 200. In the subsequent drawings, the structural components same as or equivalent to those in FIG. 5 are given the identical reference numerals and are omitted as appropriate.

A voltage applying unit 220 is comprised of a first inverter circuit INV1 and a second inverter circuit INV2 provided on paths through which the voltages are applied to a first electrode 302 and a second electrode 304, respectively. These first and second inverter circuit are provided as buffer circuits and provided to enhance the capacity of charging/discharging current for a capacitor formed by a pair of electrodes.

The first inverter circuit INV1 and the second inverter circuit INV2 are both structured by CMOS (Complementary Metal Oxide Semiconductor). A supply voltage Vdd is applied to a source terminal of a transistor M1, whereas a source terminal of a transistor M2 is grounded.

In a voltage control circuit 200 according to this modification, the inverted voltages of those of the voltage control circuit 200 shown in FIG. 5 are outputted from a first output terminal 206 and a second output terminal 208 through the first inverter circuit INV1 and the second inverter circuit INV2.

The voltage applied to the first electrode 302 and the second electrode 304 is either an output voltage of an inverter circuit, that is, Vdd or a ground voltage GND.

According to this modification, the current supply capacity for the pair of electrodes 300 is enhanced, so that the response speed of the spatial light modulator SLM 108 can be accelerated. Even if VH or VL, which is a voltage representing the data voltage DATA and mode control voltage MODE, varies, the voltage applied to the pair of electrodes 300 will be either the supply voltage Vdd or the ground voltage GND. Hence, the light control apparatus 8 can be stably controlled.

Furthermore, in a case where the logic inversion is not carried out, the first inverter circuit INV1 and the second inverter INV2 may be configured as a buffer circuit including two-stage inverters connected in series.

(Second Modification)

Figure 10:
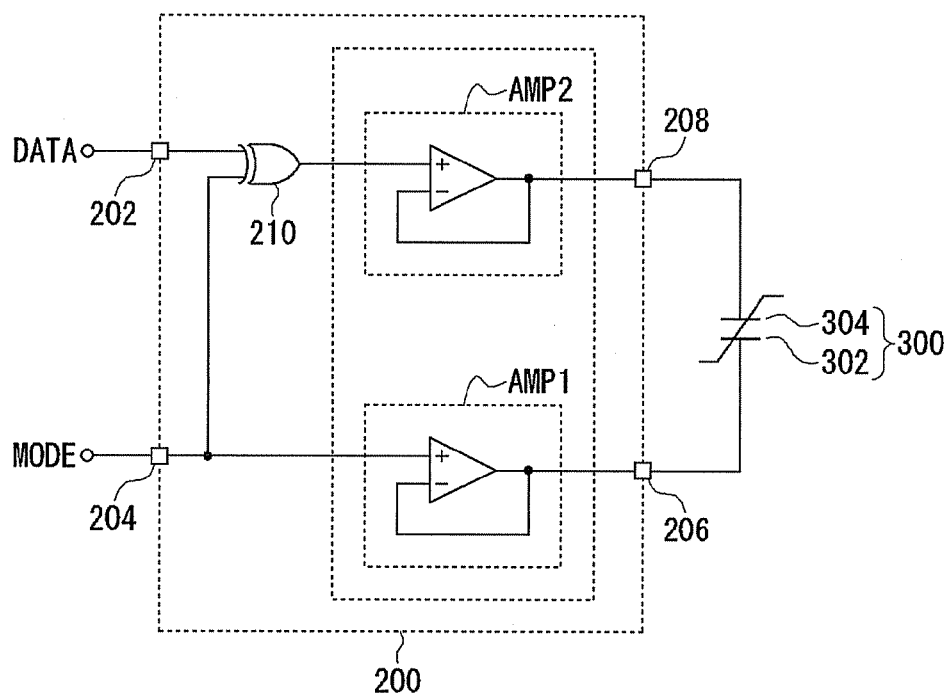
FIG. 10 is a diagram showing a second modification of a voltage control circuit.

FIG. 10 shows a second modification of the voltage control circuit 200. This voltage control circuit 200 is configured by operational amplifiers AMP1 and AMP2 in place of the inverter circuits INV1 and INV2. The operational amplifiers AMP1 and AMP2 each constitutes a voltage follower circuit in which an output terminal is connected with an inverting input terminal. By using the voltage followers, the voltage control circuit 200 according to this modification can output the same voltage as in the voltage control circuit 200 of FIG. 5.

The operational amplifiers AMP1 and AMP2 function as a buffer circuit, and can enhance the current supply capacity for the pair of electrodes 300 and can accelerate the response speed of the spatial light modulator SLM 108.

Though in FIG. 10 the buffer circuit is a unity-gain voltage follower circuit in which the output terminal and the inverting input are connected, it may be a noninverting amplifier or inverting amplifier with a gain determined by a feedback resistor.

(Third Modification)

Figure 11:
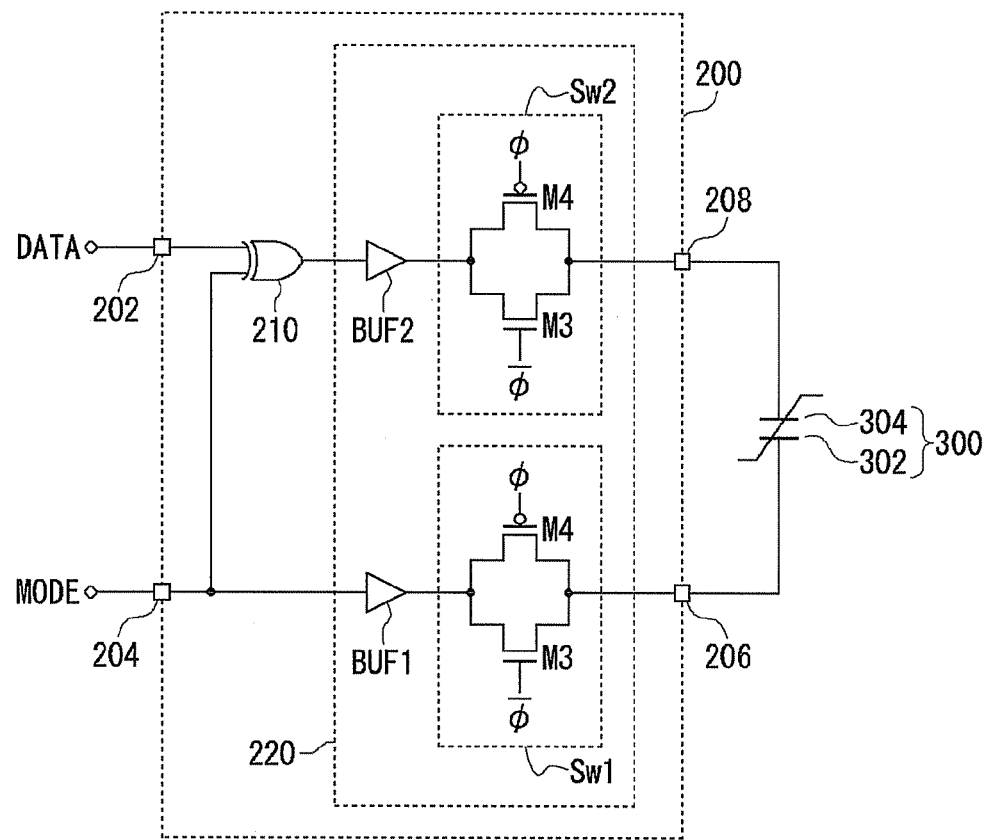
FIG. 11 is a diagram showing a third modification of a voltage control circuit.

FIG. 11 shows a third modification of the voltage control circuit 200. In addition to buffer circuits BUF1 and BUF2 constituted by the inverter circuits of FIG. 9 or the operational amplifier circuits of FIG. 10, this voltage control circuit 200 is comprised of a first switch SW1 and a second switch SW2 provided on paths through which the voltages are applied to a first electrode 302 and a second electrode, respectively.

The switches SW1 and SW2 are each configured by an N-type MOS transistor M3 and a P-type MOS transistor M4, and the on-off is controlled by a write instruction signal WRT applied to a gate terminal.

In this modification, the first switch SW1 is turned on during only a period of time in which data are written to the light modulating film 34, whereas the first switch SW1 and the second switch SW2 are turned off during other periods of time.

As a result, since according to this modification the voltage can be applied to the pair of electrodes 300 during the data write period only and the voltage applying is stopped during other periods of time, the accurate data write can be achieved. At the same time, by reducing time which it takes to apply the voltage, the occurrence of imprint phenomenon can be further suitably suppressed.

The mode control signal MODE which takes a constant value is applied to the first electrode 302 during a predetermined period of time, so that the first switch SW2 may be constantly turned on or this switch may not be provided at all.

(Fourth Modification)

Figure 12:
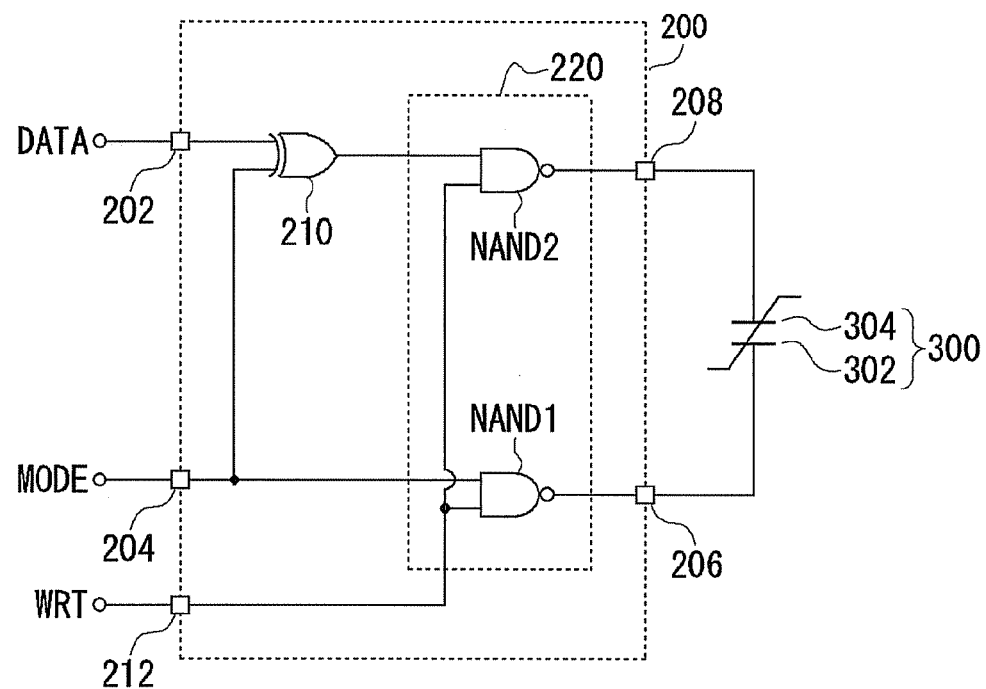
FIG. 12 is a diagram showing a fourth modification of a voltage control circuit.

FIG. 12 shows a fourth modification of the voltage control circuit 200. In this voltage control circuit 200, a voltage applying unit 220 is provided with a NAND1 as a first logic operation element and a NAND2 as a second logic operation element.

A voltage to be applied to the first electrode 302 is inputted to a first input of the first logic operation element NAND1, whereas a write instruction signal WRT instructing the write of data is inputted to a second input.

An output voltage of a control unit 210 is inputted to a first input of the first logic operation element NAND2 A as a voltage to be applied to the second electrode 304, whereas a write instruction signal WRT is inputted to a second input.

In the voltage control circuit 200 according to the present modification, the voltage of high level VH or low level VL is applied to the first electrode 302 during a period in which the write instruction signal WRT is high-level, whereas the potential of the first electrode 302 is fixed to the high level VH during a write-inhibit period in which the write instruction signal WRT is low-level.

Similarly, the voltage of high level VH or low level VL is also applied to the second electrode 304 during a period in which the write instruction signal WRT is high level, whereas the potential of the second electrode 304 is fixed to the high level VH during a write-inhibit period in which the write instruction signal WRT is low-level.

In the case where the switches are used as in FIG. 8, the voltage applied to the electrodes becomes indefinite in a period during which the switch is turned off. However, according to this modification, the first electrode 302 and the second electrode 304 are both fixed to the high level VH during a period in which the write instruction signal WRT is low-level, so that a more stable circuit operation can be achieved.

As a further modification to the present modification, a NOR circuit, an AND circuit or an OR circuit may be used in place of the NAND circuit. The selection among them may be determined according to whether a write instruction by the write instruction signal WRT is to be associated with the high level or low level, or whether the potential of the second electrode 304 is to be fixed to the high level or low level.

As indicated in the third or fourth modification, the switches or logic operation elements are provided in the voltage applying unit 220 so as to perform the control during a write period. Thereby, a plurality of them among a plurality of pair of electrodes arranged in a matrix can be controlled by a single voltage control circuit 200. This will be discussed later.

Second Embodiment

In the light control apparatus 8 of FIG. 2, a plurality of pixels 10 are arranged in a matrix, and a pair of electrodes are provided for each pixel 10, so that the reflectance can be controlled for each pixel and the apparatus is used as a spatial light modulator SLM. Accordingly, the applied voltage needs to be controlled for each pair of electrodes that correspond to each pixel 10. In the first embodiment, a description was given of a case where a voltage control circuit 200 is provided for each pair of electrodes.

A second embodiment according to the present invention concerns a voltage control circuit 200 in which a voltage is applied to a plurality of pair of electrodes arranged in a matrix, based on scan signals and data signals.

Figure 13:
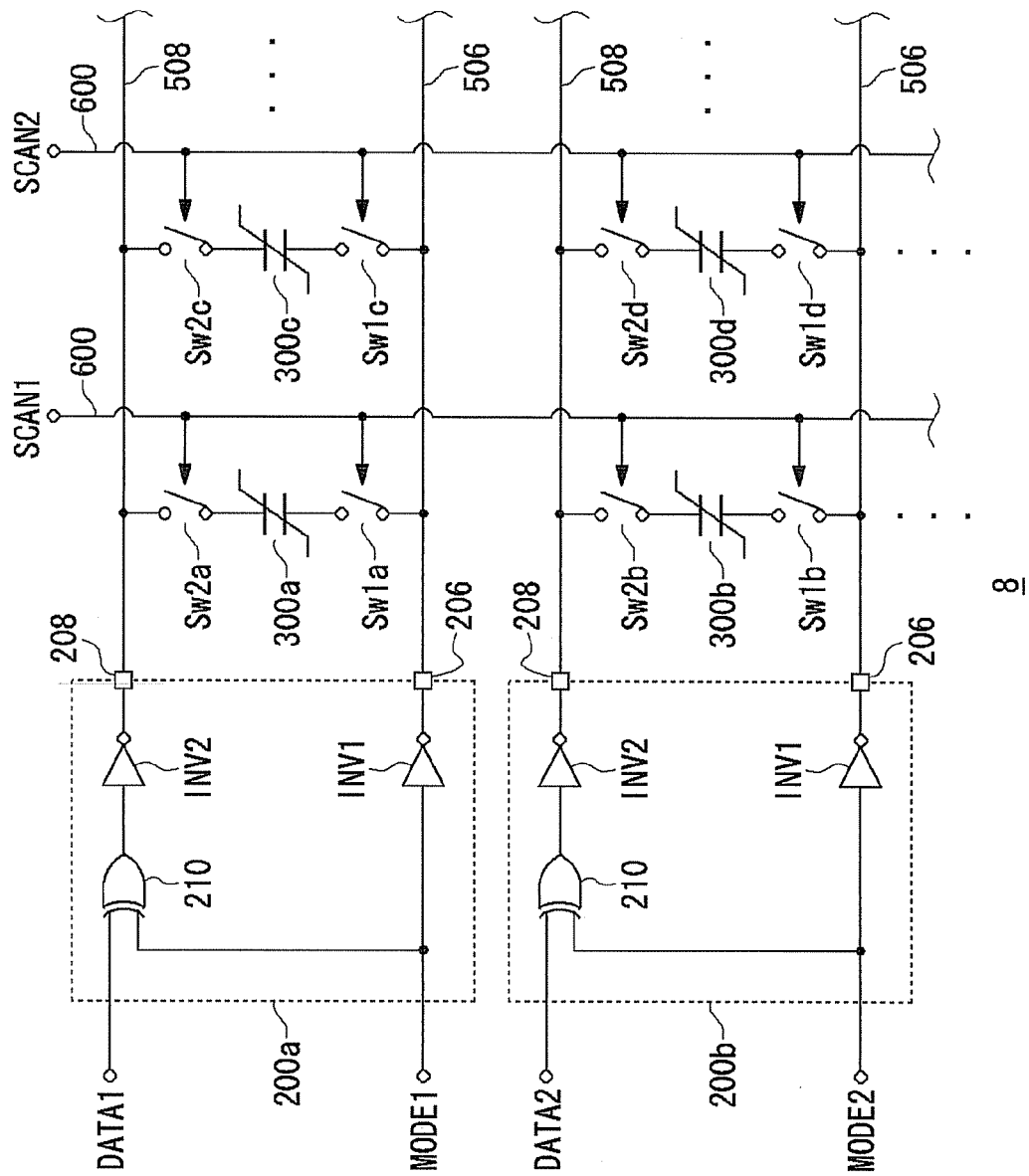
FIG. 13 is a diagram showing a structure of a pair of electrodes provided corresponding to pixels arranged in a matrix shown in FIG. 2 and a voltage control circuit that drives them.

FIG. 13 is a diagram showing a structure of a light control apparatus 8 and showing also a pair of electrodes 300 provided correspondingly to the pixels 10 arranged in a matrix shown in FIG. 2 and voltage control circuits 200 that drive them.

As for each voltage control circuit 200, the voltage control circuit 200 described in the first embodiment is used.

A voltage control circuit 200 is provided for each row of a matrix. And for a pair of electrodes 300 arranged on the same row, the voltage outputted from the same voltage control circuit 200 is applied thereto. The rows and columns in the present embodiments are determined for descriptive purposes only, and the rows and columns may be interchanged.

A first data line 506 and a second data line 508 are connected with a first output terminal 206 and a second output terminal 208 of each voltage circuit 200.

The pair of electrodes 300 arranged on the same rows are connected with the common data lines 506 and 508 via switches SW1 and SW2 provided respectively thereto. A scan line 600 is provided on each column of a matrix, and the on-off of each of the switches SW1 and SW2 is controlled by a scan signal SCAN applied to this scan line 600.

A description will be given of an operation of a light control apparatus 8 configured as described above. The scan signal goes high in the order of SCAN1 and SCAN2, and the scan lines 600 are selected in turn from the left to the right. The switches SW1 and SW2 on a selected scan line will be turned on in sequence.

This scan signal SCAN corresponds to a write signal WRT in the first embodiment. When a write is instructed by a write instruction signal WRT and the switches SW1 and SW2 are turned on, the voltage outputted from the voltage control circuit 200 is applied to a pair of electrodes on the row. Then, the switches SW1 and SW2 on other rows are in the off state.

As described above, according to the light control apparatus 8 of the present embodiment, data can be written to a pair of electrodes corresponding to pixels arranged in a matrix, respectively, by controlling the on-off of voltage for the pair of electrodes 300 by the switches SW1 and SW2.

Switching the mode control voltage MODE in a certain cycle can preferably suppress the occurrence of imprint phenomenon.

As a modification to the present embodiment, the switches SW1 and SW2 provided for each pair of electrodes may be replaced by a logic operation circuit such as a NAND circuit shown in FIG. 12.

Also, the first switch SW1 is not indispensable and may simply be replaced by a wiring. Since applying the voltage to the second electrode by the pair of electrodes 300 is stopped by turning the switch SW2 off, data can be properly written to each of pixels arranged in a matrix.

The present invention has been described based on the embodiments. These embodiments are merely exemplary, and it is understood by those skilled in the art that various modifications are possible and such modifications are also within the scope of the present invention.

According to the embodiments, a description has been given of a case where a pair of electrodes is formed by a transparent electrode 36 as the upper electrode and a first reflection layer 32 as the lower electrode, but this is not limited thereof. For example, the electrode pair that applies an electric field to the light modulating film 34 may be formed as a comb-shaped electrode on top of the light modulating film 34. At this time, an electric field is applied in the horizontal direction relative to the light modulating film 34. In this case, too, it is desirable that the comb-shaped electrode be a transparent electrode formed of ITO or the like.

According to the light control apparatus 8 of the present embodiments, a reflection-type modulator is structured, so that the transparent material can be used. For example, when silicon is used as a substrate 30, transistor elements and the like can be formed inside the silicon. Hence, an active-matrix drive can also be performed in which a means for controlling the control voltage Vcnt is provided per pixel.

In the embodiments, a description has been given of a case where the data voltage DATA takes either of two values which are high level VH or low level VL. However, this should not be considered as limiting and it may be multiple-tone digital data or analog values that change continuously.

According to the embodiments, a second reflection layer 40 is formed on top of a transparent electrode 36, but this may be reversed. In such a case, a transparent electrode 36 is formed on top of a second reflection layer 40, so that the second reflection layer 40 may be more flattened.

The second reflection layer 40 may be a half mirror formed of a metal thin film. In such a case, the manufacturing process can be more simplified than when a dielectric multilayer film is formed.

In the embodiments, a description has been given of a case where a light control apparatus 8 is used as the spatial light modulator of a hologram recording apparatus 70, but this should not be considered as limiting. It may be used in display apparatuses, optical communication switches, optical communication modulators, optical arithmetic units, encryption circuits and so forth.

In the embodiments, a description has been given of a case where an electro-optical material is used as the light modulating film 34 and an electrode pair for applying an electric field to the light modulating film 34 is provided. The present invention, however, may use a magneto-optical material as the light modulating film 34, and in such a case, the electrode pair for applying an electric field may be replaced by a magnetic field applying means for applying an magnetic field.

While the preferred embodiments of the present invention have been described using specific terms, such description is for illustrative purposes only, and it is to be understood that changes and variations may be made without departing from the spirit or scope of the appended claim.

What is claimed:

1. A voltage control circuit which applies voltage to a pair of electrodes including a first and a second electrode, the circuit comprising:
    a control unit which switches a direction of voltage applied to the pair of electrodes, in response to an operation mode of said circuit; and
    a voltage applying unit which applies a first voltage or a second voltage, set lower than the first voltage, to the first and the second electrode, respectively, based on an instruction from said control unit,
    wherein in a normal mode said voltage applying unit applies fixedly the first voltage to the first electrode, and applies a data voltage of the first voltage or second voltage to the second electrode, and
    wherein in an inversion mode said voltage applying unit applies fixedly the second voltage to the first electrode, and inverts the data voltage of the first voltage or second voltage and then applies it to the second electrode,
    wherein said control unit includes an exclusive OR circuit to which a mode control voltage that switches a mode between the normal mode and the inversion mode and a data voltage specifying a voltage to be applied to the pair of electrodes are inputted,
    wherein said voltage applying unit applies the mode control voltage to the first electrode and applies a voltage outputted from the exclusive-OR circuit to the second electrode.

2. A voltage control circuit according to claim 1, wherein a pair of electrodes to which a voltage is to be applied is a pair of electrodes to apply an electric field to a ferroelectric substance.

3. A voltage control circuit according to claim 1, wherein in a predetermine cycle said control unit switches between the normal mode and the inversion mode.

4. A voltage control circuit according to claim 1, wherein said voltage applying unit includes a first buffer and a second buffer provided on paths through which voltages are applied to the first electrode and the second electrode, respectively.

5. A voltage control circuit according to claim 4, wherein the first and the second buffer circuit each includes an inverter circuit.

6. A voltage control circuit according to claim 4, wherein the first and the second buffer circuit are a feedback amplifier including an operational amplifier.

7. A voltage control circuit according to claim 1, wherein said voltage applying unit includes a first switch and a second switch, which turn on and off the applying of voltage, provided on paths through which voltages are applied to the first electrode and the second electrode, respectively.

8. A voltage control circuit according to claim 1, wherein said voltage applying unit includes a first logic operation element and a second logic operation element provided respectively on paths through which voltages are applied to the first electrode and the second electrode,
    wherein a voltage to be applied to the first electrode is inputted to a first input of the first logic operation element, and an instruction signal that instructs the applying of voltage is inputted to a second input thereof, and
    wherein a voltage to be applied to the second electrode is inputted to a first input of the second logic 9. A control circuit according to claim 1, wherein the second voltage is ground voltage.

10. A light control apparatus, comprising:
    a substrate;
    a first reflection layer formed on said substrate;
    a light modulating film, formed by a ferroelectric substance capable of controlling refractive index by an electric field applied, which is provided on said first reflection layer;
    a pair of electrodes which contains a first electrode and a second electrode with which to apply an electric field; and
    a voltage control circuit configured to apply a voltage to the pair of electrodes,
    wherein the pair of electrodes includes a first and a second electrode, and the voltage control circuit comprises:
    a control unit which switches a direction of voltage applied to the pair of electrodes, in response to an operation mode of said circuit; and
    a voltage applying unit which applies a first voltage or a second voltage, set lower than the first voltage, to the first and the second electrode, respectively, based on an instruction from said control unit,
    wherein in a normal mode said voltage applying unit applies fixedly the first voltage to the first electrode, and applies a data voltage of the first voltage or second voltage to the second electrode, and wherein in an inversion mode said voltage applying unit applies fixedly the second voltage to the first electrode, and inverts the data voltage of the first voltage or second voltage and then applies it to the second electrode, wherein said control unit includes an exclusive OR circuit to which a mode control voltage that switches a mode between the normal mode and the inversion mode and a data voltage specifying a voltage to be applied to the pair of electrodes are inputted, wherein said voltage applying unit applies the mode control voltage to the first electrode and applies a voltage outputted from the exclusive-OR circuit to the second electrode.

11. A light control apparatus according to claim 10, wherein said light modulating film is an electro-optical material whose refractive index varies in proportion to the square of an electric field applied.

12. A light control apparatus according to claim 11, wherein the electro-optical material is lead zirconate titanate or lead lanthanum zirconate titanate.

13. A light control apparatus according to claim 12, further comprising a transparent electrode formed on an upper surface of said light modulating film, wherein said transparent electrode and said first reflection layer form said pair of electrodes.

14. A light control apparatus according to claim 11, wherein said pair of electrodes are arranged in a matrix in plurality, and wherein said voltage control circuit is provided in plurality for each of said pair of electrodes.

15. A light control apparatus according to claim 11, wherein said pair of electrodes are arranged in a matrix in plurality, wherein said voltage control circuit is provided for each row of a matrix, and wherein the respective pair of electrodes are connected with said voltage control circuit provided on the same row as said pair of electrodes, via switches provided per pair of electrodes.

* * * * *